United States Patent [19]

Ayres, Jr.

[11] Patent Number: 4,658,857

[45] Date of Patent: Apr. 21, 1987

[54] CONTROL VALVE WITH SPLIT DISC

[75] Inventor: Walter D. Ayres, Jr., Chicago, Ill.

[73] Assignee: Surgeaco, Incorporated, Alsip, Ill.

[21] Appl. No.: 778,543

[22] Filed: Sep. 20, 1985

[51] Int. Cl.[4] .......................... F16K 1/20; F16K 1/48
[52] U.S. Cl. ................................. 137/601; 251/212; 251/107
[58] Field of Search ............... 251/212, 107; 137/601, 137/599

[56] References Cited

U.S. PATENT DOCUMENTS

| | | | |
|---|---|---|---|
| 1,659,880 | 2/1928 | Kauffman | 251/212 |
| 1,887,542 | 11/1932 | Carr . | |
| 2,898,080 | 8/1959 | Smith | 251/82 |
| 3,070,345 | 12/1962 | Knecht | 251/212 |
| 3,072,141 | 1/1963 | Wheeler, Jr. | 137/512.1 |
| 3,147,768 | 9/1964 | Kennedy | 251/212 X |
| 3,384,112 | 5/1968 | Smith | 137/512.1 |
| 3,533,438 | 10/1970 | Smith | 137/512.1 |
| 3,831,628 | 8/1974 | Kitner et al. | 137/512.1 |
| 3,965,921 | 6/1976 | Buckner | 137/512.1 |
| 4,005,732 | 2/1977 | Buckner | 137/512.1 |
| 4,076,035 | 2/1978 | Frisch | 137/601 |
| 4,377,181 | 3/1983 | Chan | 137/601 X |
| 4,570,900 | 2/1986 | Lonardi et al. | 251/212 X |

FOREIGN PATENT DOCUMENTS 2604432  8/1977  Fed. Rep. of Germany ...... 251/212

Primary Examiner—Arnold Rosenthal
Attorney, Agent, or Firm—Milton S. Gerstein; Marvin N. Benn; Esther O. Kegan

[57] ABSTRACT

A control valve utilizing the conventional dual wafer check valve, which check valve has a pair of semicircular plates pivotally mounted about a pivot rod at the adjacent straight edge surfaces thereof. The plates are mounted by hinge brackets that allow initial translational movement of the pivoted edges of the plates before the rotation about the pivot shaft, so as to provide a clearance between the seal and plates at the pivoted edges. A control mechanism simultaneously and continuously controls the rotation of the wafer plates so that each plate rotates in opposite directions but the same arcuate distance. The control mechanism has a pair of levers with one lever pivoted to the rear surface of one of the plates, while their other ends are pivoted together at one end of a linear translational clevis member. The other end of the clevis member is connected to a pivotal cam follower via a lost-motion connection to convert rotary motion to translational motion. A handle and drive shaft accessible from outside of the valve body is provided to rotate the cam follower.

14 Claims, 6 Drawing Figures

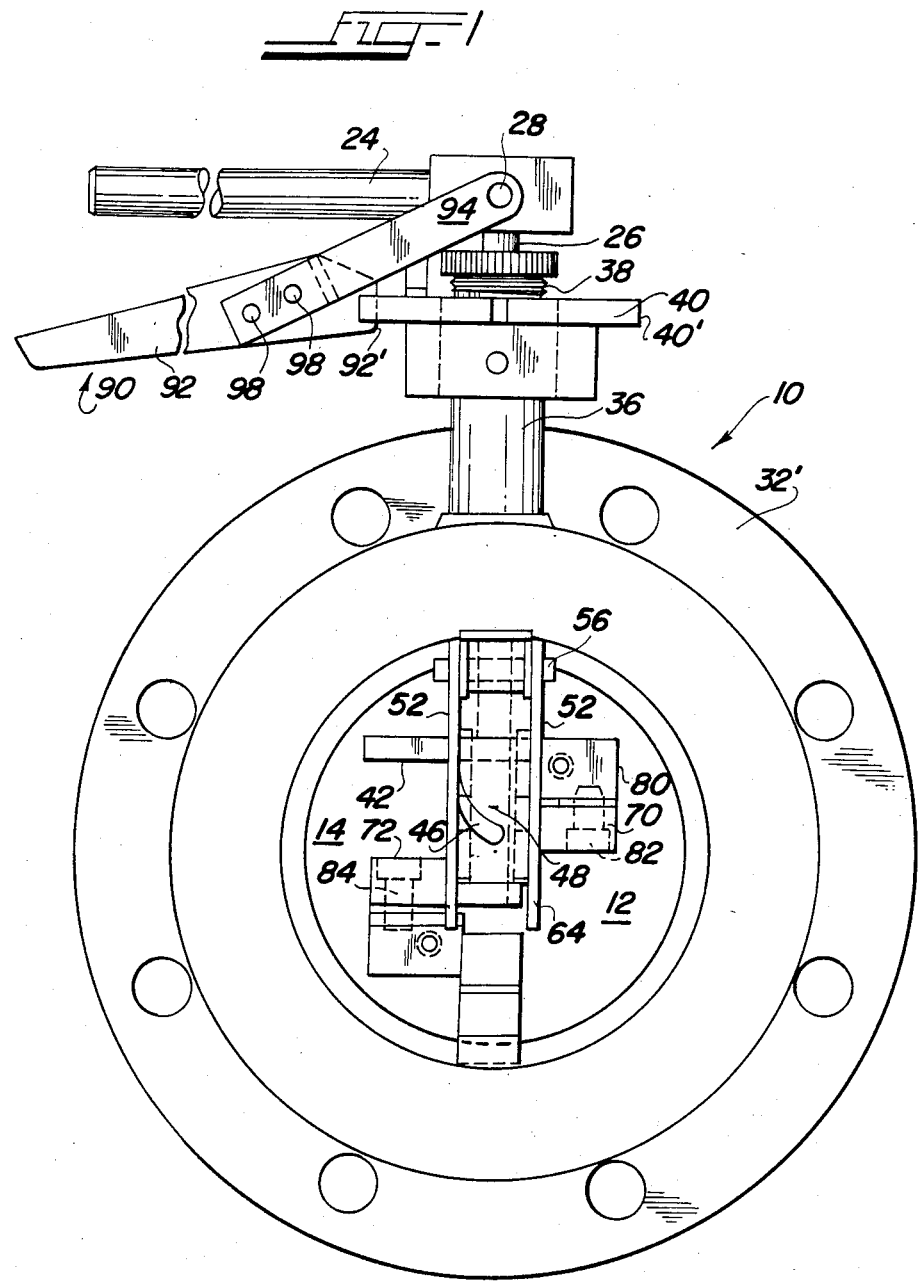

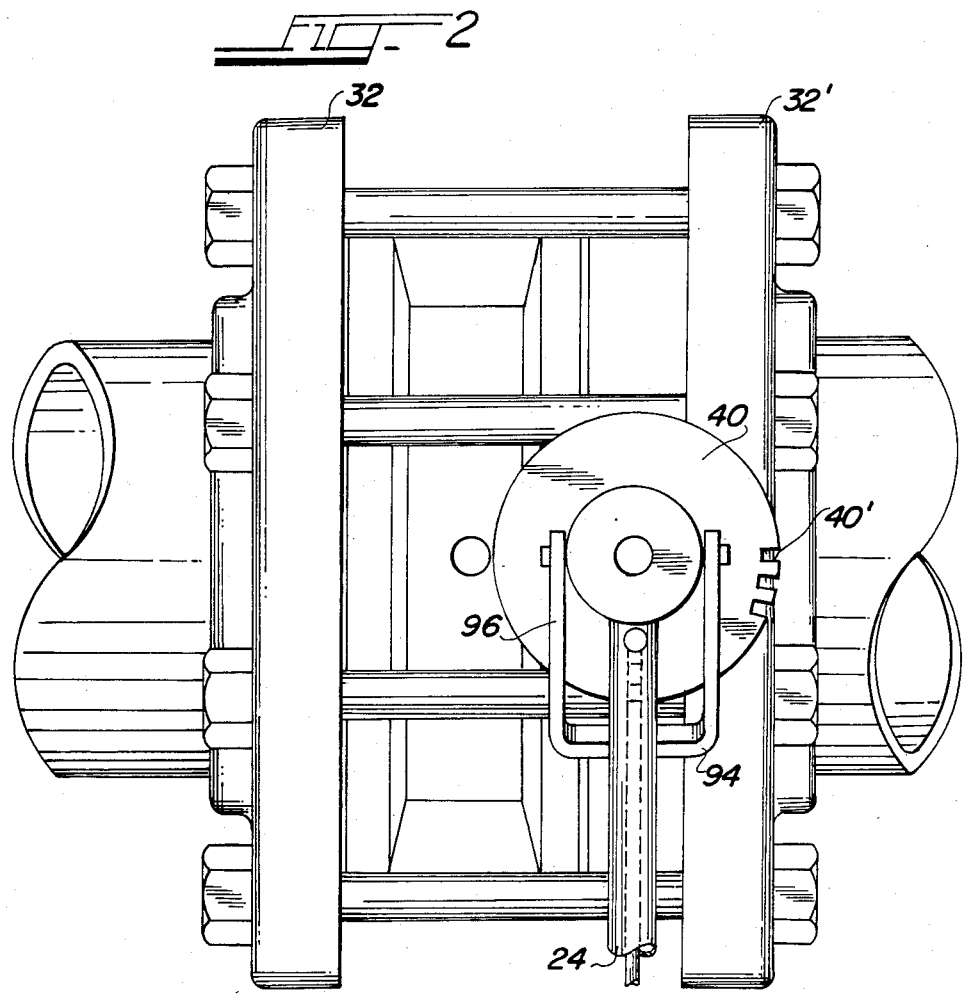

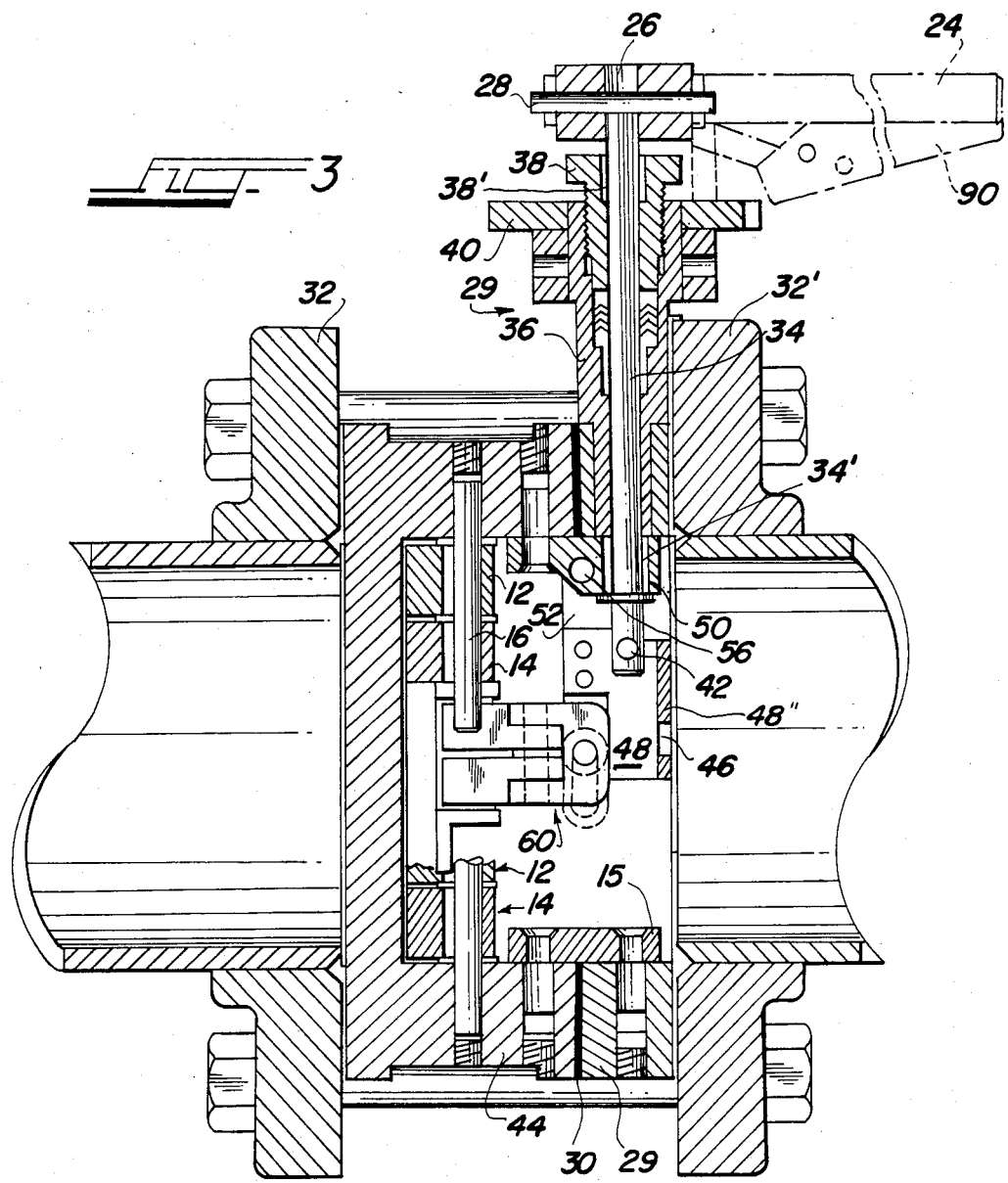

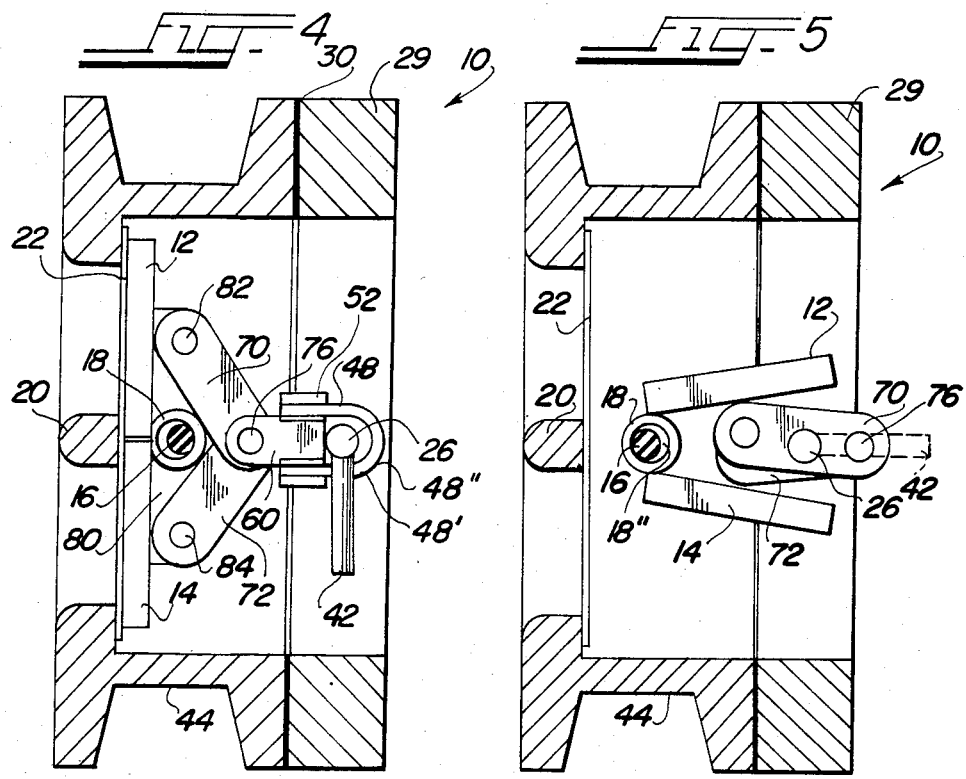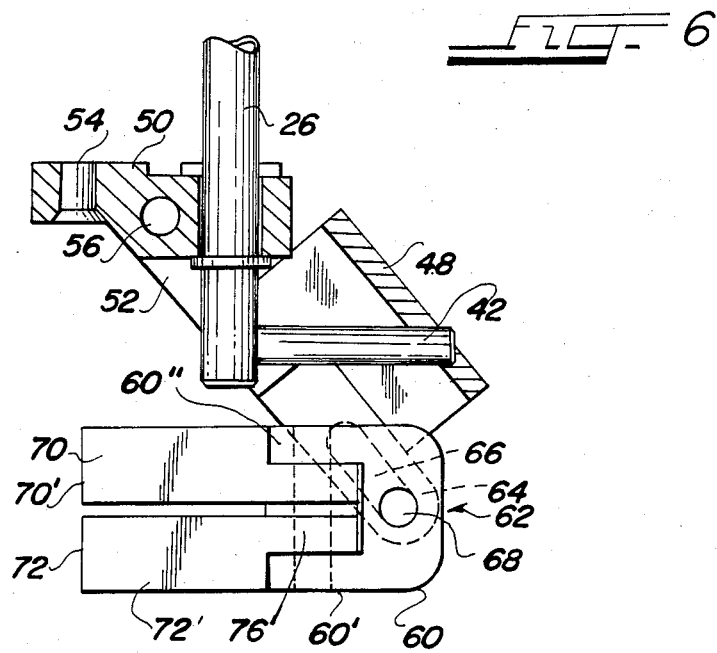

CONTROL VALVE WITH SPLIT DISC

BACKGROUND OF THE INVENTION

The present invention is directed to a novel control valve utilizing the well-known split-disc check valve design disclosed in U.S. Pat. Nos. 3,072,141, 3,965,926, and 4,005,732. The split-disc check valve, or dual-plate check valve, is a type of check valve that incorporates two separately-pivotal, semicircular-shaped plates urged toward their sealing, non-flow position by a pair of helical springs wound about a central pivot rod. Each spring biasses one of the semicircular plates to its sealing position, which biassing force is overcome by the upstream pressure of the fluid impinging upon the upstream sides of the plates, to thus force open the plates by pivoting them against such biassing force. The degree to which the plates pivot about the pivot rod is dependent upon the upstream pressure thereon, with the spring constant of each helical spring determining the pressure at which the check valve opens to allow flow therethrough. These check valves have found use in practically all areas of fluid flow, and have proven to be highly effective, owing to the quick response time thereof, excellent sealing qualities, and lack of wear of its parts because of the initial displacement of the pivoted edge of each plate away from the transverse rib of the valve body constituting a portion of the valve seat. This initial displacement of the hinge-side edge of each plate allows for the seal thereof facing upstream to be first removed from contact with any portion of the valve body, to thus eliminate the need to overcome the added friction caused by the seal's contact with the valve body during the pivotal movement of the plate during opening and closing, which contact previously had caused unequal closing of one plate relative to the other plate, and necessitated greater torque requirements for closing and opening, as well as compromising the reaction time of the valve itself to changes of pressure both upstream and downstream of the pair of plates. An alternative construction is the mounting of the seal itself to the valve body at the inlet thereof, so that when the plates first are moved during opening, their contact against the seal is eliminated during the pivotal opening thereof.

The dual-plate check valve described above also is advantageous in that it has proven to be effective without any attendant disadvantage of head or pressure loss, especially for larger sizes thereof. In addition, since the flow through the valve itself is central, and since the hinge-side of each plate is, initially lifted away from contact with the valve body before pivoting open, flow of the fluid through the valve occurs both on the outside of each plate and on the inside of each plate, thus eliminating eddy currents that in other valves, such as butterfly valves, had caused turbulence and associated pressure and head loss.

The above-described valve has hitherto had use only as a check valve, either allowing flow through a conduit with which it is connected, or preventing such flow. Though the flow rate and upstream and downstream pressure differentials help to determine the precise flow rate of the fluid through the valve, a check valve is mainly designed to allow flow in one direction only, while preventing flow in the opposite direction. For flow systems in which the rate of fluid flow must be controlled, rather than the simple direction of flow, control valves are used instead. A typically-used control valve is a butterfly valve in which a pivotal circular disc is rotated by a control member to allow a flow area through the valve body commensurate with the desired flow rate. However, conventional butterfly valves suffer from the same disadvantages noted above with regard to the flow characteristics of swing check valves, in that large eddy currents form, reducing pressure and increasing head loss, and also require the relatively-large application of controlling torque to operate the pivotal disc in order to overcome the frictional losses associated with these conventional designs. Further, butterfly valve discs are always under circumferential pressure, and a relatively large amount of torque is required to initially unseat or close this disc, because of the frictional losses associated with the seal rubbing against the valve seat.

Applicant has discovered that the dual-plate check valve construction above-described offers enourmous advantages for use as a control valve, which overcomes the disadvantages and deficiencies noted above with regard to conventional butterfly valves, as well as other currently-used control valves, which construction, with some modification, is readily adaptable and usable as a control valve for use in most environments currently serviced by other control valves, such as butterfly valves. With the modification to the structure of the dual-plate check valve according to the present invention, along with the novel control-actuating structure for converting the check valve to a control valve, the present invention provides a control valve that is superior to other conventional and currently-used control valves in: Pressure loss, reduction of eddy currents, torque requirements for operation and control, and frictional losses due to seal-contact against the valve body. Torque requirements for all manipulations of the control member for a desired flow-rate is considerably reduced with the novel control valve of the present invention, as compared with conventional control valves, such as butterfly valves, regardless of the size of valve used.

SUMMARY OF THE INVENTION

It is the primary objective of the present invention to provide a novel control valve utilizing the basic structural elements of the dual-plate check valve as the main valve member with a control structure controlling the positions of the semicircular-shaped plates for the desired flow-rate.

It is another objective of the present invention to provide a novel control valve with control structure that operates the pair of dual plates at the same time, in unison, during the setting of the flow-rate thereof.

It is yet another objective of the present invention to provide a novel control valve that incorporates therein all of the inherent advantages of the dual-plate check valve in combination with the novel control structure for controlling the opening of the valve.

It is still another objective of the present invention to provide a novel control valve in which eddy currents are eliminated, to thus achieve substantially non-turbulent flow characteristics of the fluid through the valve proper, as well as reducing the pressure loss associated with turbulent flow.

It is yet another objective of the present invention to provide a novel control valve superior to conventional control valves in which the torque required for operating the plates for controlling the flow-rate is substantially reduced, so that manual operation of the novel control valve of the present invention is possible with substantially-less torque than hitherto possible for the same valve size and flow-rate requirements.

It is also an objective of the present invention to provide a novel control valve such that the hitherto-required additional torque for initial opening of the valve plates is, for all intents and purposes, eliminated, such being accomplished by the relative distancing of the seal from the hinge-side of each valve plate before initial, pivotal opening of each plate.

Toward these and other ends, the novel control valve of the present invention includes the basic interior structure of a dual-plate check valve, where a pair of semicircular-shaped plates are pivoted side-by-side along their adjacent straight-edge surfaces about a central, longitudinal pivot rod, such that one plate is allowed to rotate in the opposite sense as the other plate. Each plate is further mounted to the rod via an elongated hinge member provided with an elongated slot or oversized opening in which may slide the rod about which the plates are rotatably mounted. Such mounting allows for initial movement of the hinge-side front surface of the plate away from the valve seat which mounts therein the seal, so that the seal offers no obstruction or friction to the pivoting of the plate about the rod, in the manner present in the conventional dual-plate check valve.

A control mechanism is provided for controlling the opening of the pair of plates to a desired angular orientation relative to the valve seat, so that the valve may be used as a control valve to allow the desired flow-rate of flowing medium. The control mechanism consists of a self-contained unit attachable to the downstream end (downstream being the direction of unidirectional flow of the comparable check valve. Of course, in the control valve state, the flow is bi-directional. For purposes, however, of clarification and description, the downstream end or direction shall be that which would normally prevail in the case of a check valve, it being understood that such is being done only as a means of describing the invention.) of the valve body, and includes a handle portion affixed to a control shaft for conjoint rotation therewith. Affixed and projecting from a lower end of the shaft is a cam pin for rotation with the control shaft. In operative association with the cam pin is a cam follower having a cam track formed in its outer surface in which rides the cam pin. Upon rotation of the control shaft via the handle, the cam pin rides in the cam track, to thus pivot the cam follower, to which is attached, via a lost motion connection, a clevis mounted for reciprocating movement along an axis perpendicular to the axis of the pivot rod mounting the dual plates for rotation. The reciprocating clevis is, in turn, pivotally connected, at its ends remote from the connection thereof with the cam follower, to the ends of a pair of disc-links pivotally connected to the pair of closure plates of the valve, one disc-link for each closure plate. As the handle rotates the control shaft and, thus, the cam pin, the clevis is urged either one way or the other by the cam follower to either rotate the semicircular-shaped closure plates in one direction or the other for allowing more or less flow therethrough. The handle is lockable in its desired position to keep the flow-rate of the valve constant. No springs or biassing members need be used at all in the entire valve mechanism and control mechanism therefor.

BRIEF DESCRIPTION OF THE DRAWING

The invention will more readily understood with reference to the accompanying drawing, wherein FIG. 1 is a front elevational view of the novel control valve of the present invention, viewing the valve from the inside and parallel to the pipe axis end of the device, with the novel control mechanism of the present invention operatively connected to the dual plates for closing and opening them;

FIG. 2 is a top plan view of the novel control valve of the present invention with the valve mounted between adjacent ends of a fluid conduit system for controlling the flow-rate therethrough;

FIG. 3 is a side elevational view, in cross-section, showing the noval control valve of FIG. 2, in which the control mechanism for opening and closing the dual plates of the valve are shown more clearly, with the control lever and associated control linkages holding the dual plates of the valve in their closed, non-flow position;

FIG. 4 is a partial cross-sectional, top view, with part of the valve casing broken away, to show the plate-actuating linkages keeping the pair of plates in their closed, non-flow position;

FIG. 5 is a view similar to FIG. 4 with the plate-actuating linkages holding the plates in a fully-open position to permit the maximum flow-rate possible through the control valve of the present invention; and FIG. 6 is a detail view showing the plate-actuating, control-linkage system for operating the dual plates of the valve of the present invention, the position being shown allowing maximum flow through the valve.

DETAILED DESCRIPTION OF THE INVENTION

Referring now to the drawings in greater detail, the novel control valve of the present invention is indicated generally by reference numeral 10. The valve 10, as explained above, includes dual closure plates 12 and 14 in the manner described in U.S. Pat. Nos. 3,072,141, 3,965,926, and 4,005,732, which patents disclose these dual closure plates in a check valve. Whereas in these patents, a pair of helical springs are used to bias the pair of closure plates into their closed, flow-cut-off position, the novel control valve of the present invention has dispensed with the helical springs entirely, and, in fact, need use no biassing elements at all in the entire mechanism. Each plate 12 and 14 is pivotally connected to pivot rod 16, best seen in FIG. 3. As clearly shown in FIGS. 4 and 5, each plate 12 and 14 is rotatably mounted about the rod 16 by hinge-brackets 18, in the manner disclosed in the above-cited patents. Each hinge-bracket 18 includes an elongated slot or opening 18 which is considerably larger in diametric extent as compared with the outer circumference of the rod 16, which allows each hinge-bracket to have play thereabout. This play is desirable, as explained in the above-cited patents, because, upon initial opening of the plates 12 and 14, the hinge-side ends of the plates 12 and 14 are firstly moved in translation away from the valve-seat mid-portion rib 20 and the seal 22 before the pivoting of the plates about the rod 16. This initial translation of the hinge-side end of the plates allows for subsequent rotation of the plates, such that the ends connected to the pivot rod 16 do not contact or rub against the seal 22, which, if it did occur, would create additional forces to overcome, creating greater pressure loss through the valve. Further, any rubbing of the straight, hinge-side ends of the plates 12 and 14 against the seal would lessen the response of the valve, would cause greater wear, and would also, ofttimes, prevent the complete and adequate closing and sealing of the valve entrance during non-flow states in the conduit system. As can be seen when viewing FIGS. 4 and 5, when the plates are closed, the rod 16 contacts the portion of the hinge-brackets on the downstream end (such "downstream" nomenclature being used relative to the use of the valve as a check valve which has one-directional flow, whereas in the present invention there is bidirectional flow thereof) whereas when the plates are opened, the rod contacts the "upstream" end thereof (again, the nomenclature "upstream" only being used by way of example since the valve of the present invention is bi-directional) before rotation of the plates about the hinge-plates, their straightside ends are first moved in translation until the upstream ends of the hinge-plates contact the rod 16, after which the plates pivot thereabout in the well-known manner.

As can also be seen in FIGS. 4 and 5, the rib 20 is the only obstruction to total, central axial flow of the fluid in the conduit system, which in itself provides less pressure loss, reduction of turbulent flow, and, since the straight-edge hinge-ends of the plates are first moved in translation away from the valve seat, eliminates practically all eddy currents, all of which have not been possible with other, conventional control valves, such as butterfly valves. With conventional butterfly valves, eddy currents about the central, axial direction can cause large head losses due to the turbulent effects thereof. In the present novel control valve, all such eddy currents are effectively eliminated.

The plates 12 and 14 are controlled through the novel control mechanism of the present invention. The control mechanism includes a rotatable handle 24 keyed by pin 28 to a control shaft 26, as best seen in FIG. 3. The control shaft 26 extends vertically downwardly, parallel to the rod 16, into the interior of the valve, on the downstream end thereof, away from the rod 16. The handle and control shaft, as well as the other control linkages to be described below, are mounted to the downstream end of the valve proper by end-flange assembly 29, with gasket ring 30 sealing the flange to the end of the interior valve body. The lower splice 15 orients and unitizes the valve body 44 and the end flange member 29. The valve 10 itself is mountable between ends of a conduit system, for use, by mounting-flange connections, such as those indicated by reference numerals 32 and 32' in FIGS. 2 and 3. The shaft 26 is mounted for rotation by bearings 34 and 34', provided by housing 36. Gland 38 with associated bearing 38' rotatably mounts the upper portion of the control shaft, and is threadingly received in the upper end of the housing 36. Collar ring assembly 40 is mounted about the upper end of housing 36 for use in locking the handle assembly in place, in the manner to be described below.

As can be seen in FIG. 3, the bottom end of the control shaft 26 is provided with a cam pin 42, also shown in FIGS. 5 and 6. This cam pin 42 is formed integrally with the bottom end of the control shaft, and is rotated with the rotation of the handle 24 and control shaft 26. The bottom end of the control shaft and cam pin extend into the interior next to the valve body, defined by the boundaries of the valve housing proper, indicated by reference numeral 44 in FIG. 3, and the end-flange assembly 29. The cam pin 42 rides in a cam track 46, best seen in FIG. 1, which cam track is provided in cam follower 48. The cam follower 48 is a generally U-shaped member, as seen in FIG. 4. This cam track or groove 46 preferably begins in the left-hand leg 48' of the cam follower and ends approximately midway through the base portion 48" of the cam follower, as seen in FIG. 1. An upper splice member 50 pivotally mounts an upper ear or lug 52 of the cam follower for rotation in a vertical plane, as shown by comparing FIG. 3 with FIG. 6. The splice member 50 is secured to the upper interior of the valve body 44 by rivet 54, with pivot pin 56 pivotally joining the ear 52 to the splice member 50. It may, therefore, be seen that, as the control shaft 26 is rotated by the handle 24, the cam follower may be pivoted about the pivot pin 56, to either pivot upwardly or downwardly depending upon the direction of rotation of the control shaft and attached cam pin 42.

The cam follower 48, as can be seen in FIGS. 4 and 6, is, in turn, connected to a U-shaped clevis member 60 via a lost-motion connection 62. The lower leg portions of the U-shaped cam follower are provided with a downwardly-projecting guide link 64 in which is formed an elongated slot 66, in which slides a roll pin 68. In the preferred embodiment, each leg of the U-shaped cam follower has a downwardly-extending guide link 64 with associated elongated slot 66, with the clevis member being preferably sandwiched between the legs, in the manner shown in FIG. 4. The roll pin 68 projects outwardly from either side of the base of the clevis member 60, for riding in the slots 66. Thus, when the cam follower 48 is rotated in the counterclockwise direction when viewing FIG. 3, the lost-motion connection causes the clevis member 60 to translate toward the downstream side, (when the flow is from flange 32 toward flange 32') to cause the opening of the dual plates together, in the manner to be further described below.

The legs 60' and 60" of the U-shaped clevis member are, in turn, rotatably connected to a pair of disc or plate links 70 and 72. The links 70 and 72 are pivotally connected to the clevis member 60 via roll pin 76, such that each link 70 and 72 is free to rotate relative to the clevis member as the clevis member is translated during its movement caused by movement of the cam follower. When completely opening the plates 12 and 14, the clevis member 60 is pulled downstream by the guide links 64, pulling along with it the links 70 and 72, which, during such movement, pivot about pin 76 until they reach substantially parallel, side-by-side relationship, in the manner shown in FIG. 5. The ends 70' and 72' of the links 70 and 72, respectively, are, in turn, pivotally connected to a disc bracket 80 via pivot pins 82 and 84, respectively. Thus, as the clevis member 60 is translated downstream, pulling the links 70 and 72 therewith, the ends 70' and 72' of the links draw open the plates 12 and 14 by causing them to pivot via their hinge-brackets 18 about the rod 16, until the plates 12 and 14 take the position shown in FIG. 5.

The control valve of the present invention may be used such that the rod 16 for the dual plates extends in a vertical plane, as shown in FIG. 5, with the concomitant orientation of the plates in a vertical plane. Such orientation also preferably includes independent hinge plates in the manner disclosed in U.S. Pat. No. 3,965,926, so that the weight of the upper hinge-plates do not bear upon the hinge-plates of the lower hinge-plates, which prevents the non-uniform closing of the dual plates, as described in that patent.

As shown in FIGS. 1 and 2, the arm assembly includes a lock-lever assembly 90 that is rotatable with the handle 24, and is used to lock the handle in place at the desired setting for the control valve. The locklever assembly 90 includes a lock lever 92 mounted between the ends of two locking yoke members 94 and 96 by rivets 98. The other ends of the locking yokes 94 and 96 are, in turn, pivotally connected to the handle assembly by pin 100. The collar 40 includes a series of notches or grooves formed in the circumferential edge surface 40' thereof, which series of grooves extends for an arcuate extent of 90 degrees about the edge surface. In the preferred embodiment, such notches or grooves are provided every 10 degrees along the 90 degree arcuate extent, so that the locking lever 92 may be inserted in a desired one of the grooves or notches via its collar-mating edge surface 92', seen in FIG. 1. Thus, the handle 24 may be locked in position every 10 degrees during its total arcuate path of 90 degrees. Thus, a total of ten separate locking positions are possible in the preferred embodiment, with each setting providing a desired setting of the plates 12 and 14, to adjust the plates to the desired flow-rate. Of course, more or fewer notches may be provided to either allow for more or less fine control of the valve setting, depending upon the size of the valve used, the required control thereof, and the environment in which the valve is to be used. The notch at zero degrees corresponds to the total closing-off of the valve, while the notch at 90 degrees corresponds to the complete opening of the wafer plates 12 and 14, to allow the maximum flow through the valve. It is, of course, to be understood that the number of notches provided for locking in place the handle 24 may vary. Further, other locking means may be employed as well. Further, instead of the use of the handle assembly shown, it is also possible to use instead a gearing arrangement with a worm gear driven by a motor that will rotate the drive shaft 26 to an infinite number of settings for the plates 12 and 14 of the control valve of the invention. Such showing of the worm gear and motor is not indicated in the drawings, it being well-known and conventional to rotate any shaft by a worm gear and motor therefor.

It is also possible to power the above valve in the same fashion with well-known pneumatic or hydraulic actuation devices.

While a specific embodiment of the invention has been shown and described, it is to be understood that numerous changes and /or modifications may be made therein without departing from the scope, spirit and intent of the invention as set out in the appended claims.

What is claimed is:

1. A control valve for controlling the bidirectional flow of a fluid through a conduit comprising:

a main housing having a first end-flange for mounting to an end of a conduit, and a second end-flange spaced from said first end-flange for mounting to another end of a conduit in order to position the valve in a conduit system to control the flow of fluid therethrough;

a pair of pivotal closure plates for controlling the flow of fluid through the valve, said pair of plates being mounted adjacent said first end-flange thereof for movement toward and away from said first end-flange;

means for mounting said pair of closure plates for pivotal rotation about adjacent end-edges thereof, such that one of said pair of plates rotates in the counterclockwise direction, and the other of said pair of plates rotates in the clockwise direction;

a first lever means operatively connected to each of said first and second closure plates, said first lever means being spaced from said first end-flange in said main housing, and comprising a first end thereof connected to each of said pair of closure plates for continuous connection therewith for all positions of said closure plates; and a second end; said first lever means being movable relative to said first end-flange for pivoting said pair of closure plates to a desired flow position;

second lever means operatively connected to said second end of said first lever means for moving said first lever means relative to said first end-flange, to thus pivot said pair of closure plates, said second lever means being mounted in said main housing;

control means operatively associated with said second lever means for controlling the movement thereof, and, therefore, the movement of said first lever means and said pair of closure plates; said control means comprising shaft means having a first end operatively connected with said second lever means in said main housing, and a second end remote from said first end projecting outwardly of said main housing, and means operatively connected to said second end of said shaft means for rotating said shaft means to position said pair of closure plates to a desired flow position, said means for rotating said shaft means comprising a handle means affixed to said second end of said drive shaft for conjoint rotation therewith, and handle-locking means for locking said handle means in a desired position determinate of the flow rate desired through the valve; said handle-locking means cooperating with a circumferential portion of said main housing for locking said handle means in place.

2. The control valve according to claim 1, wherein said handle-locking means comprises a locking yoke rotatable with said handle means and pivotal relative thereto, said locking yoke being pivotal toward said circumferential portion of said main housing to lock said handle means in place at the desired position, said locking yoke locking said handle means at any desired angular position of said handle means in its arcuate path of travel thereof.

3. A control valve for controlling the bidirectional flow of a fluid through a conduit comprising:

a main housing having a first end-flange for mounting to an end of a conduit, and a second end-flange spaced from said first end-flange for mounting to another end of a conduit in order to position the valve in a conduit system to control the flow of fluid therethrough;

a pair of pivotal closure plates for controlling the flow of fluid through the valve, said pair of plates being mounted adjacent said first end-flange thereof for movement toward and away from said first end-flange;

means for mounting said pair of closure plates for pivotal rotation about adjacent end-edges thereof, such that one of said pair of plates rotates in the counterclockwise direction, and the other of said pair of plates rotates in the clockwise direction;

a first lever means operatively connected to each of said first and second closure plates, said first lever means being spaced from said first end-flange in said main housing, and comprising a first end thereof connected to each of said pair of closure plates for continuous connection therewith for all positions of said closure plates, and a second end; said first lever means being movable relative to said first end-flange for pivoting said pair of closure plates to a desired flow position;

second lever means operatively connected to said second end of said first lever means for moving said first lever means relative to said first end-flange, to thus pivot said pair of closure plates, said second lever means being mounted in said main housing;

control means operatively associated with said second lever means for controlling the movement thereof, and, therefore, the movement of said first lever means and said pair of closure plates; said control means comprising shaft means having a first end operatively connected with said second lever means in said main housing, and a second end remote from said first end projecting outwardly of said main housing, and means operatively connected to said second end of said shaft means for rotating said shaft means to position said pair of closure plates to a desired flow position; said first lever means comprising a pair of disc links, one for each of said pair of closure plates, each said disc link having a first end pivotally connected to the rear surface of a respective said closure plate for movement therewith, and a second end remote from said first end; and a link clevis member having a first end and a second end spaced from said first end thereof; said second ends of said pair of disc links being pivotally connected together to said first end of said link clevis member for movement therewith when said link clevis member is moved.

4. The control valve according to claim 3, wherein said link clevis member is mounted for reciprocable, translatory motion in said main housing upon movement of said second lever means; said second lever means comprising a pivotal member rotatably mounted in said main housing, and means for pivotally mounting said pivotal member to an inner circumferential portion of said main housing; and lost-motion connection means connecting said first end of said second lever means to said second end of said first lever means; said first end of said second lever means being constituted by the portion of said pivotal member thereof remote from said means for pivotally mounting said pivotal member, and said second end of said first lever means being constituted by the first end of said link clevis member.

5. The control valve according to claim 4, wherein said lost motion connection means comprises an elongated slot formed in said remote portion of said pivotal member, and a pin connected to said second end of said link clevis member for riding movement in said elongated slot; said link clevis member being a substantially U-shaped member with the legs thereof pivotally mounting thereto said pair of disc links, a means for pivotally connecting said pair of disc links to said legs of said U-shaped link clevis member.

6. The control valve according to claim 4, wherein said pivotal member comprises a cam follower having a cam track formed therein; and said control means comprises a cam pin at said first end of said drive shaft for movement in said cam track, to thus pivot said cam follower upon rotation of said drive shaft by said handle means.

7. The control valve according to claim 6, wherein said cam follower is a substantially U-shaped member having a base, and a pair of leg portions projecting from the edges of said base, and a pair of guide links being mounted to said pair of leg portions of said cam follower, one said guide link for one said leg portion, each of said guide links having an elongated slot formed in the end thereof remote from said means pivotally mounting said second lever means in which slides said pin of said link clevis member.

8. The control valve according to claim 7, wherein said cam track comprises a first end on one of said pair of leg portions of said cam follower, and a second end on said base thereof.

9. In a valve having a main body, a first end, and a second end, a pivot rod mounted adjacent said first end extending parallel to a diametric extension of said first end, a first pivotal wafer plate having a straight edge pivotally connected to said pivot rod, and a second pivotal wafer plate having a straight edge pivotally connected to said pivot rod, said straight edges of said wafer plates being pivoted to said pivot rod adjacent each other and adjacent to said first end, each said wafer plate being semicircular in shape so that together they may close off a circular opening, the improvement comprising;

means mounted in said main body operatively connected to each of said wafer plates for continuously and simultaneously controlling the angular positions of said wafer plates relative to said pivot rod, in order to position said wafer plates at any desired angular orientation along their arcs of travel relative to said pivot rod;

rotary means mounted to said main body having a first end projecting into said main housing and operatively connected to said means for continuously and simultaneously controlling, for moving said means for controlling along a continuous reversible path, and a second end projecting from said main housing and accessible outwardly of the outer circumference to said main body, said rotary means being rotatable exteriorly by said second end thereof;

means for interconnecting said first end of said rotary means to said means for controlling in order to convert the rotary motion of said rotary means into at least partial translational movement of said means for controlling, and partial translational movement of said wafer plates;

said means for controlling comprising a pair of connecting links, one said connecting link for one said wafer plate, each said connecting being pivotally associated with said rear of its respective wafer plate at one end of said connecting link; said connecting links being pivotally connected together at their other ends along a pivot axis parallel to said pivot rod and coplanar therewith in the same diametric plane; and a translatable clevis member having a first end portion pivotally mounting thereto said other ends of connecting links.

10. In a valve having a main body, a first end, and a second end, a pivot rod mounted adjacent said first end extending parallel to a diametric extension of said first end, a first pivotal wafer plate having a straight edge pivotally connected to said pivot rod, and a second pivotal wafer plate having a straight edge pivotally connected to said pivot rod, said straight edges of said wafer plates being pivoted to said pivot rod adjacent each other and adjacent to said first end, each said wafer plate being semicircular in shape so that together they may close off a circular opening, the improvement comprising;

means mounted in said main body operatively connected to each of said wafer plates for continuously and simultaneously controlling the angular positions of said wafer plates relative to said pivot rod, in order to position said wafer plates at any desired angular orientation along their arcs of travel relative to said pivot rod;

rotary means mounted to said main body having a first end projecting into said main housing and operatively connected to said means for continuously and simultaneously controlling, for moving said means for controlling along a continuous reversible path, and a second end projecting from said main housing and accessible outwardly of the outer circumference of said main body, said rotary means being rotatable exteriorly by said second end thereof;

means for interconnecting said first end of said rotary means to said means for controlling in order to convert the rotary motion of said rotary means into at least partial translational movement and said means for controlling, and partial translational movement of said wafer plates;

said rotary means comprising a drive shaft projecting into the interior of said main housing, and operatively connected with said means for converting rotary motion to at least partial translational movement; and a cam pin projecting from the end of said drive shaft in said main housing, said end in said main housing constituting said first end of said rotary means; and said means for converting rotary motion to at least partial translational movement comprising a cam follower having a cam track in which rides said cam pin of said rotary means, said cam follower being pivotally mounted at one end thereof to a portion of the inner circumferential surface of said main housing for swinging movement of the other end thereof, and slot means at said other end of said cam follower; said means for controlling having a pin for riding in the slot of said slot means to establish a lost-motion connection therebetween.

11. The improvement according to claim 10, wherein said rotary means further comprises means for locking said drive shaft in non-rotatable position, so that said wafer plates are held in the flow-rate position desired; said connecting links being positioned in said main housing in a side-by-side relationship such that said connecting links are defined in different planes; said connecting links pivoting and translating in parallel planes that are perpendicular to the axis of said pivot rod.

12. The improvement according to claim 11, wherein said drive shaft has a rotary axis parallel to said pivot rod and coplanar therewith along the same diametric plane; said locking means comprising a collar mounted about said second end of said drive shaft, and a lock-lever; said rotary means further comprising a handle fixedly connected to said second end of said drive shaft for conjoint rotation therewith; said lock-lever having a first end pivotally connected to said handle for movement toward and away from said collar, said collar having a series of slots formed along the outer circumferential edge surface thereof in which may be positioned a portion of said lock-lever to prevent movement of said handle and associated drive shaft, to thus lock in place said drive shaft from further movement.

13. The improvement according to claim 12, wherein each slot of said series of slots in said collar is spaced every 10 degrees for an arcuate extent of 90 degrees about said outer circumferential surface of said collar, so that said handle may be rotated a total of 90 degrees in which it may be locked in position every 10 degrees, to thus move said wafer plates approximately 90 degrees from their closed, non-flow positions to their fully-open, full-flow positions.

14. In a dual, wafer-plate valve having a main valve body, a pair of pivotally mounted, semicircular wafer plates, a pivot rod for pivotally mounting said wafer plates along the adjacent, straight edges thereof so that the wafer plates may pivot in opposite directions when they are rotated, said pivot shaft being generally mounted along an axis generally parallel to a diameter of the valve opening, such that the flowing fluid may pass through a first inlet opening to a second outlet opening of the valve; hinge bracket means for mounting each said wafer plate to said pivot rod, such that said plates may first have translational movement at their straight edges thereof relative to said pivot rod in order to distance the straight pivoted edges of the plates from the seal at the opening with which it is operatively connected, the improvement comprising:

control means operatively connected at a first end thereof to each of said wafer plates, at the rear/surfaces of said plates, for simultaneously and continuously pivoting said wafer plates about said pivot rod so as to set said plates at a desired position relative to said pivot rod; said control means simultaneously rotating each of said plates the same arcuate distance but in opposite directions;

said control means having a second end remote from said first end and projecting outwardly of said main valve body for access thereto outside of said valve body, whereby said valve may be used as a control valve.

* * * * *